(12) United States Patent
Strothmann

(10) Patent No.: US 9,140,535 B2
(45) Date of Patent: Sep. 22, 2015

(54) POSITION SENSOR AND/OR FORCE SENSOR

(76) Inventor: Rolf Strothmann, Saarbrücken (DE)

(*) Notice: Subject to any disclaimer, the term of this patent is extended or adjusted under 35 U.S.C. 154(b) by 224 days.

(21) Appl. No.: 13/704,715

(22) PCT Filed: Jun. 15, 2011

(86) PCT No.: PCT/DE2011/050020
§ 371 (c)(1),
(2), (4) Date: Dec. 17, 2012

(87) PCT Pub. No.: WO2012/019602
PCT Pub. Date: Feb. 16, 2012

(65) Prior Publication Data
US 2013/0088216 A1    Apr. 11, 2013

(30) Foreign Application Priority Data
Jun. 17, 2010   (DE) .................. 10 2010 024 168

(51) Int. Cl.
G01B 7/00    (2006.01)
G01D 5/14    (2006.01)
G01L 1/14    (2006.01)

(52) U.S. Cl.
CPC *G01B 7/00* (2013.01); *G01D 5/145* (2013.01); *G01L 1/14* (2013.01)

(58) Field of Classification Search
CPC .................. G01P 3/488; G01B 7/00
USPC ..................................... 324/207.15
See application file for complete search history.

(56) References Cited

U.S. PATENT DOCUMENTS

| 2,558,485 | A | | 6/1951 | Gow | |
|---|---|---|---|---|---|
| 5,195,601 | A | * | 3/1993 | Voigt et al. | 180/412 |
| 5,896,076 | A | | 4/1999 | Van Namen | |
| 6,130,494 | A | * | 10/2000 | Schob | 310/90.5 |
| 7,443,069 | B2 | * | 10/2008 | Chen et al. | 310/181 |
| 2004/0011578 | A1 | * | 1/2004 | Hoffmann et al. | 180/218 |
| 2011/0284300 | A1 | * | 11/2011 | Cheng et al. | 180/65.51 |

FOREIGN PATENT DOCUMENTS

DE    102008034553    2/2010

* cited by examiner

*Primary Examiner* — Patrick Assouad
*Assistant Examiner* — Haidong Zhang
(74) *Attorney, Agent, or Firm* — Lucas & Mercanti, LLP; Klaus P. Stoffel

(57) ABSTRACT

A device for determining a position of a movable, magnetizable and/or conductive body relative to a stator that has at least one pole winding. Apparatuses are provided for detecting a measurement signal that depends on the inductance of the pole winding, wherein the inductance is influenced by the position of the body.

16 Claims, 2 Drawing Sheets

POSITION SENSOR AND/OR FORCE SENSOR

The present application is a 371 of International application PCT/DE2011/050020, filed Jun. 15, 2011, which claims priority of DE 10 2010 024 168.7, filed Jun. 17, 2010, the priority of these applications is hereby claimed and these applications are incorporated herein by reference.

BACKGROUND OF THE INVENTION

The invention relates to a device for determining a position of a movable, magnetizable or/and conductive body relative to a stator which has at least one pole winding.

SUMMARY OF THE INVENTION

The invention is based on the object of creating a novel sensor device of this type which makes possible the determination of positions and possibly forces with higher precision than the expanding measuring strips or the like which have been used in the past for this purpose.

The device according to the invention which meets this object is characterized by devices for determining a measuring signal which is dependent on the inductivity of the pole winding influenced by the position of the body.

When a predetermined functional relationship exists between the measuring signal and the position, the position can be determined in this manner.

Moreover, the body may be movable against an elastic restoring force and the device may form a force sensor which utilizes for the force measurement a predetermined functional relationship between the restoring force and the position of the body.

In an embodiment of the invention, the stator has several pole windings whose winding axes extend preferably star like from the stator, wherein the aforementioned body surrounds the stator, preferably ring shaped or spherically shaped. In the latter case, radial displacement positions of the body relative to the stator can be determined.

Preferably, the body is movable in a plane defined by the pole winding axes of several pole windings of the stator, while changing the above mentioned position.

In a particularly preferred embodiment of the invention, the body is formed by a pipe surrounding the stator and the stator includes several pole windings with pole winding axes extending perpendicular to the pipe axis. In particular, three pole windings are provided whose pole winding axes include an angle with each other of preferably 120°. The determining factor for the inductivity of the pole windings is then their respective distance to the inner wall of the pipe.

In another particularly preferred embodiment, the stator has several pole windings switched in a star configuration. Advantageously, in this manner, relative differences between the inductivities of the pole windings can be utilized for determining the position because of the voltage division which takes place.

The devices for measuring the measuring signal are preferably provided for evaluating the changing potential at the star point caused by alternating voltage application of the pole windings.

In particular, the pole windings can be provided for receiving voltage pulses in the manner of operation of a synchronous motor by pulse width modulation. In that case, cyclical potential leaps can be produced at the star point whose magnitude depends on the respective position of the body relative the stator.

In a further development of the invention, the stator can be arranged in the middle of the pipe in the longitudinal direction, and the pipe is elastically held at its ends while producing radial restoring forces. Pivoting of the pipe about a center axis extending perpendicular to the pipe axis can then falsify the measuring result only to a small extent.

In another embodiment, the body has, on an inner ring shaped or spherical shaped surface, located opposite the end faces of several pole windings, a structuring with projections or/and recesses.

In particular, this structuring may be constructed periodically and preferably circumferentially around the inner surface.

Preferably, a structuring is constructed in such a way that a measuring signal is obtained depending on the position of rotation of the body around the ring axis or spherical axis, so that the determination of positions of rotation of the body about the ring axis or of torsion forces is possible. Instead of a structuring or in addition thereto, a magnet arrangement on the mentioned inner surface would also be possible, which results in different inductivities of the pole windings due to changes of the degree of saturation of the magnetization of the pole windings.

In a further development of the invention, the current supply of the at least one pole winding can be controllable in dependence on the measuring signal, while producing a desired magnetic force exerted by the stator on the body. In this manner, for example, a contactless rotary bearing could be formed for a ring body or a spherical body.

Possibilities of application of the described device are, for example, handles of pulled or pushed vehicles, wherein a control of an auxiliary drive is effected through a measurement of the exerted manual force. Other possibilities for application are joysticks.

In the following the invention will be explained in more detail with the aid of an embodiment and the enclosed drawings which refer to this embodiment. In the drawing:

DETAILED DESCRIPTION OF THE INVENTION

Figure 1:
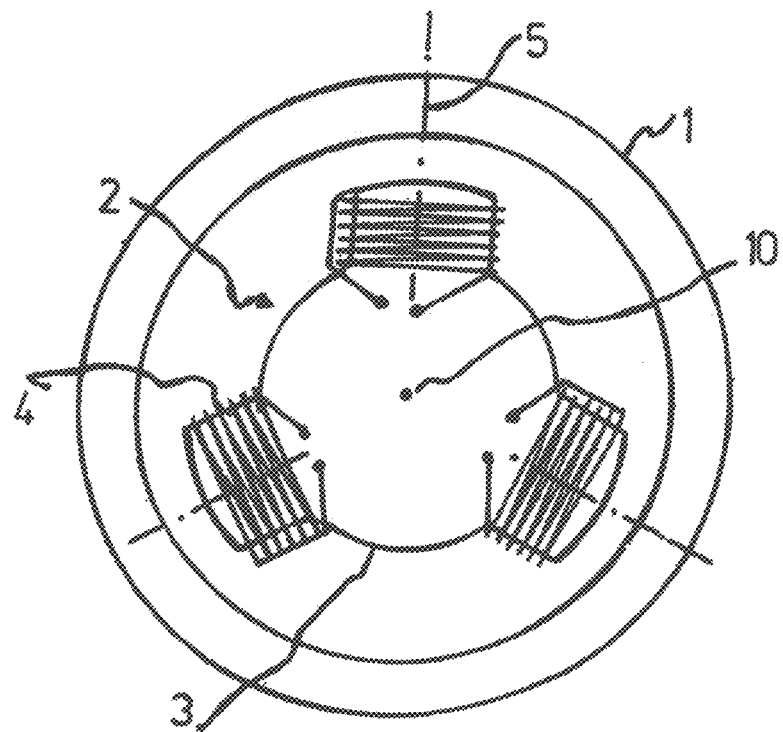
FIG. 1 is a cross sectional view of a device according to the invention serving for constructing a force sensor.

A steel pipe 1 serves as the handle of a vehicle to be pulled or pushed (not shown), for example, a golf caddy. In the steel pipe 1, which forms a conductive and magnetizable body, a stator 2 is accommodated in the longitudinal middle thereof.

The stator 2 comprised of a steel metal bundle 3 has, in the illustrated embodiment, three pole windings 4 whose axes 5 include an angle with each other of 120°. The axes 5 define a plane which is perpendicular to the pipe axis 10.

Figure 4:
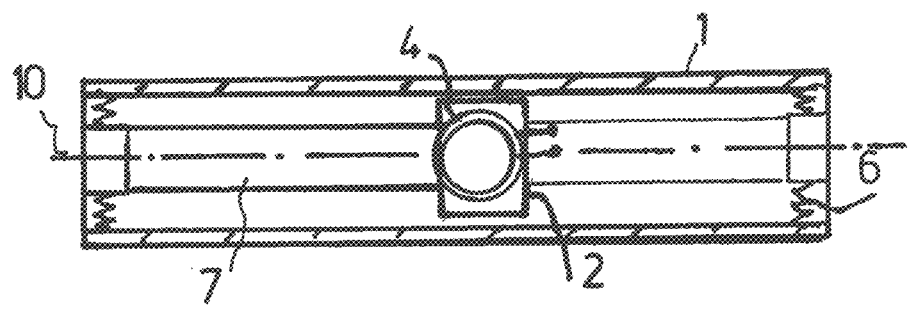
FIG. 4 is a longitudinal sectional side view of the device of FIG. 1.

As can be seen from FIG. 4, the steel pipe 1 is supported by means of springs 6 at its ends on a stationary pipe core 7, connected to the aforementioned vehicle. Always three springs 6 can be arranged corresponding to the pole windings 4. As long as no radial forces act on the steel pipe 1, all three end faces of the pole windings 4 have the same gap distance to the oppositely located inner wall of the steel pipe 1. Instead of springs an intermediate layer, which is elastically deformable while changing its thickness could, also be considered.

Figure 2:
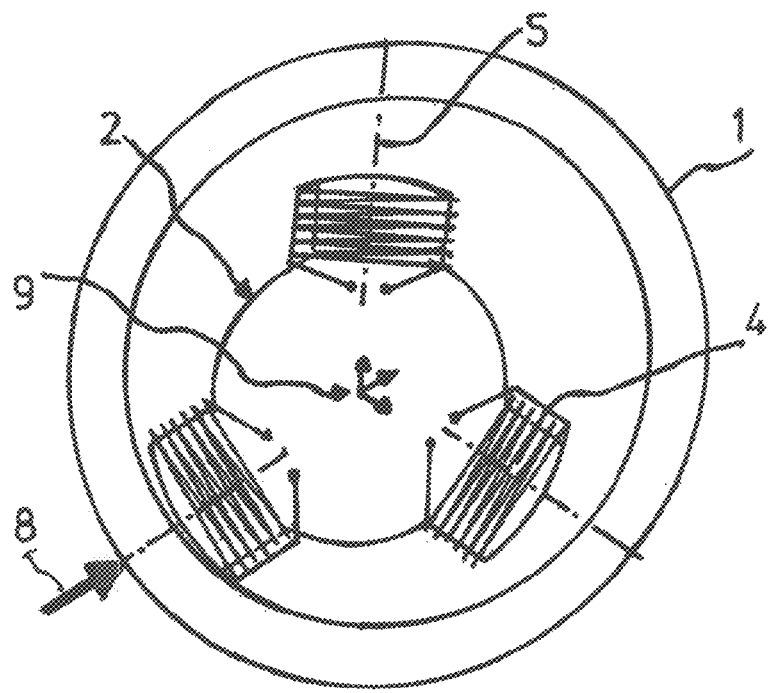
FIG. 2 shows the device of FIG. 1, wherein an outer body has been radially moved against a stator surrounding the outer body.
Figure 3:
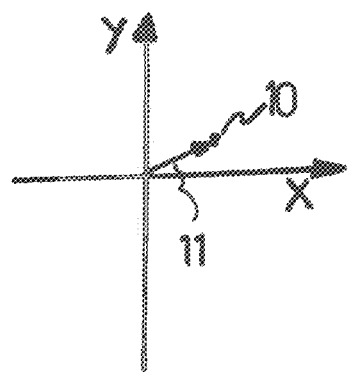
FIG. 3 shows an illustration explaining the relative displacement of outer body and stator.

When a force is exerted on the steel pipe 1 forming the handle, for example, in the direction of the arrow 8, shown in FIG. 2, the steel pipe 1 is displaced relative to the stator 2, parallel to the plane defined by the three pole winding axes 5. In FIG. 3 this plane is shown as the xy plane.

When this displacement occurs, one of the three pole windings 4 is moved closer with its end face toward the inner wall of the steel pipe 1, while the end faces of the other two pole windings move further away from the inner wall. The radial displacement of the steel pipe 1, relative to the stator 2, is described by the three vectors illustrated at 9.

In the xy plane illustrated in FIG. 3, the pipe axis 10 shifts away from the zero point corresponding to the axial position of FIG. 1 in accordance with directional vector 11. The directional vector 11 results from the sum of the three vectors illustrated in FIG. 2 at 9.

Since the stator 2 is arranged in the longitudinal middle of the steel pipe 1, tilting of the steel pipe 1, about an axis extending around the longitudinal center and perpendicular to the pipe axis 10, has little influence on the respective width of the air gap between the inner wall of the pipe and the end face of the pole windings.

Figure 5:
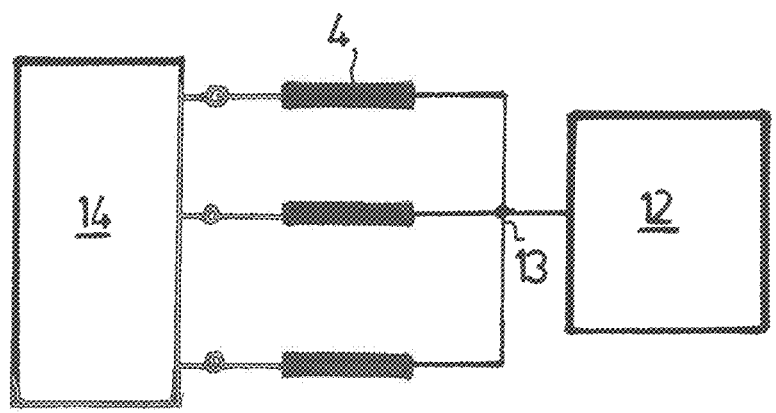
FIG. 5 is a schematic illustration explaining the overall device.

As can be seen from FIG. 5, the three pole windings 4 are switched in a star connection. A device 12 measures the respective potential at the star point 13 and evaluates the potential. A device 14 applies to the pole windings 4, switched in a star connection, voltage pulses in the manner of the voltage application of an electrical synchronous machine during operation, in accordance with the pulse width modulation method. With this cyclically alternating application to the pole windings 4, different potentials are adjusted at the star point. The potential differences are dependent upon the respective ratio of the inductivities of the pole windings 4 relative to each other, whose magnitude, in turn, depends on the distance of the respective end faces of the pole windings 4 from the inner wall of the steel ring 1 at a given moment. Using the stored relationships between the potential differences and the mentioned distances, the displacement vectors illustrated at 9 can be established and, in this manner, the total relative displacement between steel pipe 1 and stator 2 can be determined.

If, in addition, the relationship between the restoring force of the springs 6 and the displacement vectors is already known, actuation forces including their directions can be determined from the established displacement vectors.

It is understood that, when arranging several stators 2 within the steel pipe 1 at a distance from the longitudinal middle, displacements of the steel pipe 1 about the axis extending perpendicular to the above mentioned pipe axis can additionally be determined.

When magnets are arranged on the inner side of the pipe wall, it would even be possible to determine the rotations of the steel pipe 1 about the longitudinal axis of the pipe.

Any manual forces determined by the above described sensor could be used, for example, for controlling an auxiliary drive or for controlling the position of the pull rod.

The invention claimed is:

1. A sensor for force measurement, comprising: a magnetizable or/and conductive body moveable relative to a stator having at least one pole winding and moveable against an elastic restoring force generated by a spring or an elastically deformable member; a device determines a measuring signal which is dependent upon inductivity of the pole winding which is influenced by the position of the body relative to the pole winding; and the device determines a force applied to the body which utilize known relationships between the measuring signal, the position of the body and the restoring force.

2. The sensor according to claim 1, wherein the stator has several pole windings with windings with winding axes that extend in a star pattern from the stator, and the body surrounds the stator.

3. The sensor according to claim 2, wherein the body surrounds the stator in a ring shape or a spherical shape.

4. The sensor according to claim 2, wherein the body, by changing the position, is movable in a plane defined by the pole winding axes of the several pole windings of the stator.

5. The sensor according to claim 1, wherein the body is formed by a pipe surrounding the stator, and the stator has several pole windings with pole winding axes that extend perpendicular to an axis of the pipe.

6. The sensor according to claim 1, wherein the stator has three pole windings whose pole winding axes enclose with each other respectively an angle of 120°.

7. The sensor according to claim 1, wherein the stator has several pole windings which are switched in a star connection.

8. The sensor according to claim 7, wherein the devices for determining the measurement signal are provided at a star point for evaluating a potential that changes with alternating voltage application of the pole windings.

9. The sensor according to claim 8, wherein the pole windings are provided for receiving voltage pulses in a manner of operation of an electrical synchronous motor by pulse width modulation.

10. The sensor according to claim 5, wherein the stator is arranged in a longitudinal center of the pipe, and the pipe is elastically mounted at its ends for producing radial restoring forces.

11. The sensor according to claim 2, wherein the body has a ring shaped or spherically shaped inner surface located opposite end faces of several pole windings, the body further having a structuring comprised of projections or/and recesses on the inner surface.

12. The sensor according to claim 11, wherein the structuring is constructed periodically.

13. The sensor according to claim 12, wherein the structuring extends circumferentially around the inner surface.

14. The sensor according to claim 11, wherein the structuring is constructed so as to result in the measurement signal depending upon the position of rotation of the body about the ring or sphere axis.

15. The sensor according to claim 1, wherein current supply of the at least one pole winding is controllable with aid of the measuring signal by producing a desired magnetic force acting from the stator on the body.

16. The sensor according to claim 15, wherein the sensor forms a contactless rotary bearing for a ring shaped or spherically shaped body.

* * * * *